US012626045B2

(12) United States Patent
Wolpert et al.

(10) Patent No.:  US 12,626,045 B2
(45) Date of Patent:     May 12, 2026

(54) CELL-BASED SIGNAL CONNECTIVITY BETWEEN WAFER FRONTSIDE AND BACKSIDE

(71) Applicant: International Business Machines Corporation, Armonk, NY (US)

(72) Inventors: David Wolpert, Poughkeepsie, NY (US); Leon Sigal, Monsey, NY (US); Ruilong Xie, Niskayuna, NY (US); Nicholas Anthony Lanzillo, Wynantskill, NY (US); Biswanath Senapati, Mechanicville, NY (US); Lawrence A. Clevenger, Saratoga Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 18/092,126

(22) Filed: Dec. 30, 2022

(65) Prior Publication Data

US 2024/0220696 A1      Jul. 4, 2024

(51) Int. Cl.
*G06F 30/392*          (2020.01)
*G06F 30/33*          (2020.01)
(Continued)

(52) U.S. Cl.
CPC ............ *G06F 30/392* (2020.01); *G06F 30/33* (2020.01); *G06F 30/394* (2020.01); *G06F 2119/18* (2020.01)

(58) Field of Classification Search
CPC ........ G06F 30/39; G06F 30/392; G06F 30/33; G06F 30/394; G06F 30/323;
(Continued)

(56) References Cited

U.S. PATENT DOCUMENTS 6,495,454 B2    12/2002  Livengood
7,530,034 B2 *   5/2009  Betz ........................ G06F 30/39
                                                716/132
(Continued)

FOREIGN PATENT DOCUMENTS

EP            3671859 A1      6/2020
TW        202230692 A        8/2022
(Continued)

OTHER PUBLICATIONS

Taiwan Intellectual Property Office, Related Application # 11320260370. Search Report. Mar. 14, 2024. pp. 5.

*Primary Examiner* — Paul Dinh
(74) *Attorney, Agent, or Firm* — Harrity & Harrity, LLP

(57)          ABSTRACT

A semiconductor structure includes a first backside metal rail that extends across the structure and a second backside metal rail parallel and adjacent to the first backside metal rail. The first and second backside metal rails bound a first circuit row. The structure also includes a backside signal wire that interrupts the second backside metal rail; and a third backside metal rail that extends across the structure parallel and adjacent to the second backside metal rail. The second and third backside metal rails bound a second circuit row. The structure also includes gate metal pitches, which extend across the structure perpendicular to the backside metal rails. The structure also includes a frontside signal wire above the gate metal pitches; and a signal via that penetrates the structure and connects the backside signal wire to the frontside signal wire.

21 Claims, 8 Drawing Sheets

(51) Int. Cl.
   *G06F 30/394*        (2020.01)
   *G06F 119/18*        (2020.01)

(58) Field of Classification Search
   CPC .. G06F 30/327; G06F 30/347; G06F 2119/18;
                H10D 89/10; H10D 84/975; H10D
                                              84/983
   USPC ........................................................ 716/127
   See application file for complete search history.

(56)                    References Cited

U.S. PATENT DOCUMENTS

| | | | |
|---|---|---|---|
| 10,950,546 B1 | 3/2021 | Doornbos | |
| 11,239,208 B2 | 2/2022 | Chuang | |
| 2013/0154128 A1* | 6/2013 | Wang .................... | G06F 30/392 |
| | | | 716/127 |
| 2021/0225830 A1 | 7/2021 | Liu | |
| 2022/0068813 A1 | 3/2022 | Chen | |
| 2022/0093594 A1 | 3/2022 | Song | |
| 2022/0130759 A1 | 4/2022 | Huang | |
| 2022/0130760 A1 | 4/2022 | Wu | |
| 2022/0181258 A1 | 6/2022 | Liebmann | |
| 2022/0189515 A1 | 6/2022 | Lee | |
| 2022/0335194 A1 | 10/2022 | Chen | |

FOREIGN PATENT DOCUMENTS

| | | | |
|---|---|---|---|
| TW | 202240454 A | 10/2022 |
| TW | 202427748 A | 7/2024 |
| WO | 2022060473 A1 | 3/2022 |

* cited by examiner

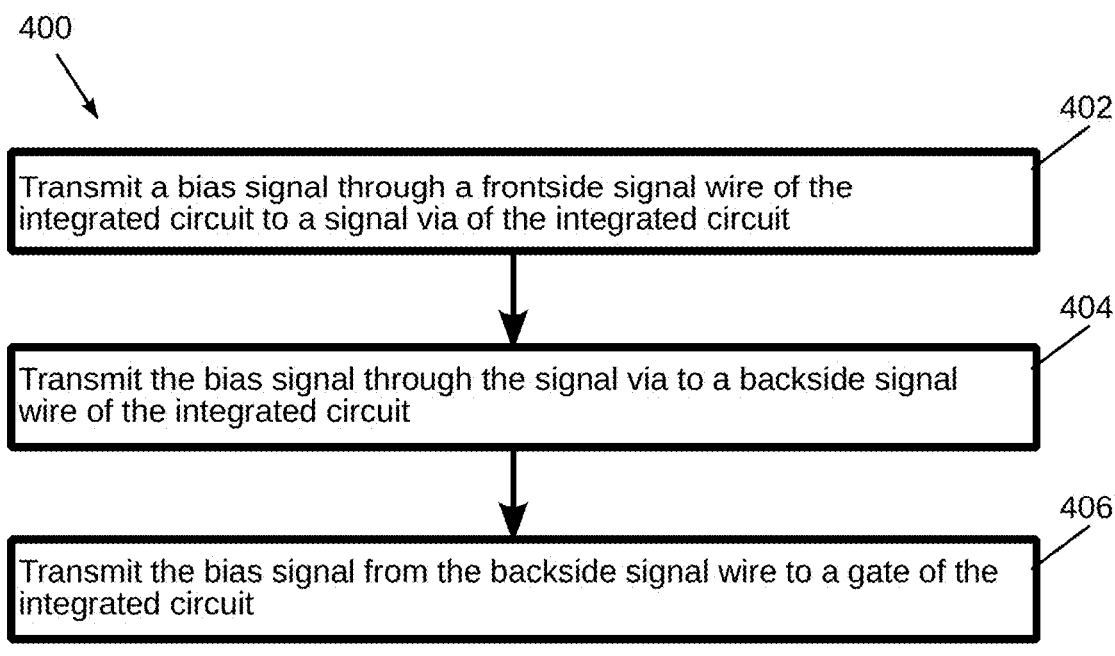

400

402
Transmit a bias signal through a frontside signal wire of the integrated circuit to a signal via of the integrated circuit 404
Transmit the bias signal through the signal via to a backside signal wire of the integrated circuit 406
Transmit the bias signal from the backside signal wire to a gate of the integrated circuit

*FIG. 4*

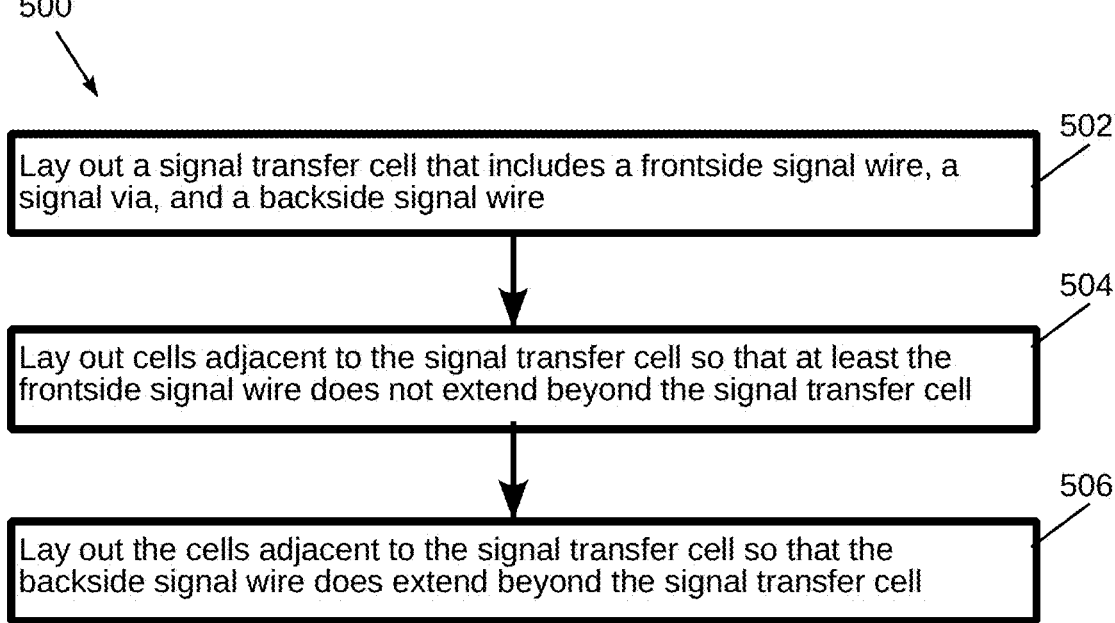

500

502
Lay out a signal transfer cell that includes a frontside signal wire, a signal via, and a backside signal wire 504
Lay out cells adjacent to the signal transfer cell so that at least the frontside signal wire does not extend beyond the signal transfer cell 506
Lay out the cells adjacent to the signal transfer cell so that the backside signal wire does extend beyond the signal transfer cell

*FIG. 5*

CELL-BASED SIGNAL CONNECTIVITY BETWEEN WAFER FRONTSIDE AND BACKSIDE

BACKGROUND

The present invention relates to the electrical, electronic, and computer arts, and more specifically, to power and signal distribution within very large scale integrated (VLSI) circuits.

Historically, VLSI designs have utilized a back end of line (BEOL) power and signal grid, in which the metal layers in between the semiconductor devices and the chip package connections (e.g. controlled-collapse chip connections, or C4s) are used both to provide power and ground connections to the devices as well as signal wires between devices. A relatively recent development in VLSI design involves the additional metallization of the opposite side of the wafer (referred to as the backside of the wafer) as well as the frontside of the wafer.

SUMMARY

Principles of the invention provide techniques for cell-based signal connectivity between wafer frontside and backside.

In one aspect, an exemplary semiconductor structure includes a first backside metal rail that extends across the structure in a first direction; a second backside metal rail, which extends across the structure parallel and adjacent to the first backside metal rail. The first and second backside metal rails bound a first circuit row. The exemplary semiconductor structure also includes a backside signal wire that interrupts the second backside metal rail; and a third backside metal rail that extends across the structure parallel and adjacent to the second backside metal rail. The second and third backside metal rails bound a second circuit row. The exemplary semiconductor structure also includes adjacent and parallel gate metal pitches, which extend across the structure perpendicular to and above the backside metal rails. The gate metal pitches define a width of a signal transfer cell that occupies the first and second circuit rows. The exemplary semiconductor structure also includes a frontside signal wire that extends across the structure above the gate metal pitches; and a signal via that penetrates the structure perpendicular to the metal rails and to the gate metal pitches and that connects the backside signal wire to the frontside signal wire.

According to another aspect, an exemplary method for operating an integrated circuit includes transmitting a bias signal through a frontside signal wire of the integrated circuit to a signal via of the integrated circuit; transmitting the bias signal through the signal via to a backside signal wire of the integrated circuit; and transmitting the bias signal from the backside signal wire to a gate of the integrated circuit.

In one or more embodiments, the frontside signal wire, the signal via, and the backside signal wire are contained within a signal transfer cell.

According to another aspect, an exemplary method for designing an integrated circuit includes laying out a signal transfer cell that includes a frontside signal wire, a signal via, and a backside signal wire; and laying out cells adjacent to the signal transfer cell so that at least the frontside signal wire does not extend beyond the signal transfer cell.

In view of the foregoing, techniques of the present invention can provide substantial beneficial technical effects. For example, one or more embodiments provide one or more of:

Ability to break frontside and/or backside power rails for signal separation, while still providing reliable power to all components of an integrated circuit.

Reduced power signal path length with reduced $I^2R$ losses.

A set of pertinent process constraints on cell design to provide optimal dimensions for a placeable cell for use with place and route tooling.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

BRIEF DESCRIPTION OF THE DRAWINGS

FIG. 4 depicts, in a flowchart, steps of a method for operating an integrated circuit, according to exemplary embodiments.

FIG. 5 depicts, in a flowchart, steps of method for designing an integrated circuit, according to exemplary embodiments.

DETAILED DESCRIPTION

Figure 1:
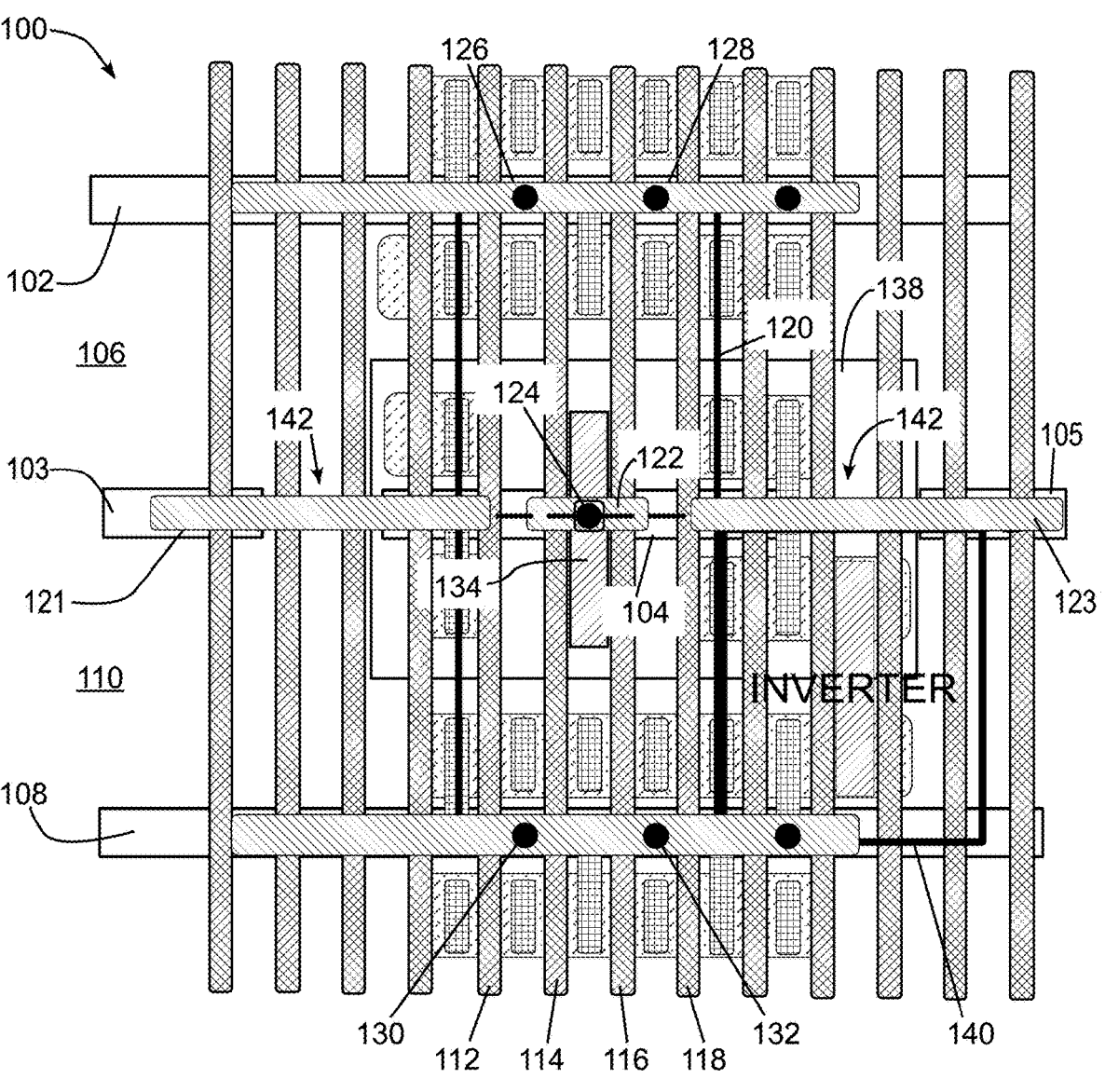
FIG. 1 depicts, in a schematic, a top down (plan) view of a semiconductor structure, according to exemplary embodiments.
Figure 2:
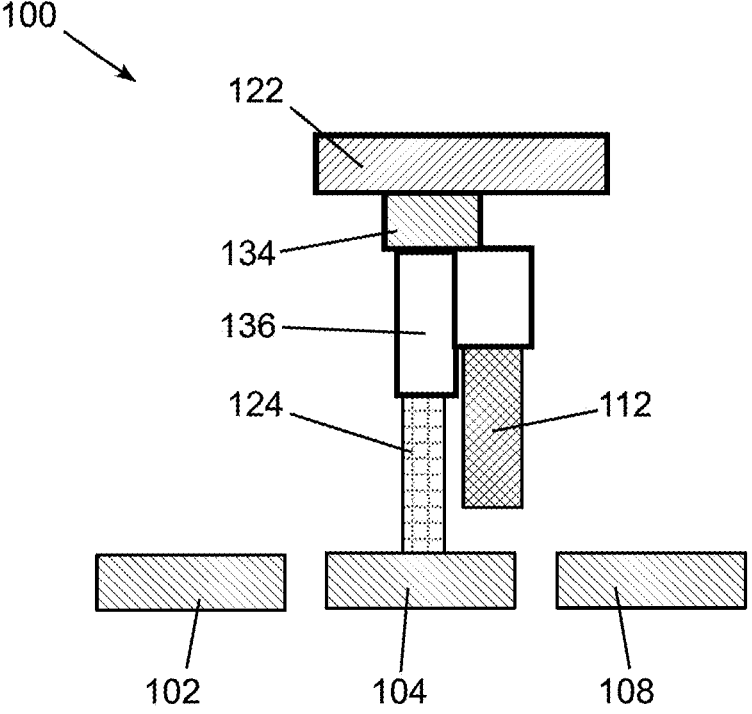
FIG. 2 depicts, in a schematic, a side view of the semiconductor structure that is shown in FIG. 1.

FIG. 1 depicts, in a schematic, a top down (plan) view of a semiconductor structure 100, according to exemplary embodiments. FIG. 2 depicts, in a schematic, a side view of the semiconductor structure that is shown in FIG. 1.

The semiconductor structure 100 includes a first backside metal rail 102 that extends across the structure in a first direction, and a second backside metal rail 104 that extends across the structure parallel and adjacent to the first backside metal rail. The second backside metal rail 104 is in line with additional rails 103, 105. Whereas the metal rail 104 is used as a signal rail, the rails 103, 105 are power rails. The backside metal rails 102, 103, 104, 105 bound a first circuit row 106. The structure 100 also includes a third backside metal rail 108 that extends across the structure parallel and adjacent to the second backside metal rail. The second and third backside metal rails bound a second circuit row 110.

Exemplary materials for the metal rails include tantalum (Ta), aluminum (Al), platinum (Pt), gold (Au), titanium (Ti), palladium (Pd) or any combination thereof. The rails may be deposited by, for example, chemical vapor deposition (CVD), plasma enhanced CVD (PECVD), physical vapor deposition (PVD), plating, thermal or e-beam evaporation, or sputtering. A planarization process such as chemical mechanical planarization/polishing (CMP) is performed to remove any electrically conductive material (overburden) from the top surface of the structure.

Four adjacent and parallel gate metal pitches 112, 114, 116, 118 extend across the structure perpendicular to and above the backside metal rails. The four gate metal pitches define the width of a signal transfer cell 120 that occupies the first and second circuit rows. The configuration shown is an example embodiment, with the particular count of gate metal pitches necessary for the cell defined by a number of additional process dimensions such as the minimum length and minimum spacing of the frontside and/or backside metal patterning module as well as the through-silicon via contact spacing.

Although the gate metal pitches are referred to as "metal," in one or more embodiments they will be high-k/metal gate (HKMG) structures, in which layers of dielectric, metal, and diffusion barriers are combined. Exemplary dielectric materials for such structures include hafnium oxide (HfO), zirconium oxide (ZrO), titanium oxide (TiO) with dielectric constant, k, on the order of 3-15 times higher than silicon dioxide ($SiO_2$), e.g., on the order of 10-50, or similar suitable materials. Generally, oxides of refractory metals provide high-k dielectrics. Exemplary metals include, for NMOS (n-type metal-oxide-semiconductor (MOS) transistors), tantalum (Ta), tantalum nitride (TaN), niobium (Nb) (single metal gate); and for PMOS (p-type MOS transistors), tungsten nitride/ruthenium oxide laminate ($WN/RuO_2$) (layered metal gate). In some older technology nodes, aluminum (Al) or doped polycrystalline silicon (Si) may be used. Exemplary diffusion barriers include tantalum nitride, titanium nitride, indium oxide, copper silicide, tungsten nitride. The skilled artisan will be generally familiar with HKMG structures, and, given the teachings herein, will be able to adapt known techniques to implement one or more embodiments.

A frontside signal wire 122 also extends across the structure above the gate metal pitches. The frontside signal wire 122 is used as a signal rail. It is separated by gaps from adjacent metal rails 121, 123 that are used as power rails. A signal via 124 penetrates the structure perpendicular to the metal rails and to the gate metal pitches in a space between the middle two gate metal pitches, and connects the second backside metal rail 104 to the frontside signal wire 122. In one or more embodiments, peripheral power vias 126, 128, 130, 132 penetrate the structure 100 perpendicular to the metal rails and to the gate metal pitches in spaces between the pitches and in registry with the metal rails at edges of the signal transfer cell, so that locations of the peripheral power vias and the signal via define an "X" (i.e., an "X" shape). The skilled artisan will be generally familiar with making a via in a semiconductor structure, and, given the teachings herein, will be able to adapt known techniques to implement one or more embodiments.

In one or more embodiments, the power shapes are not necessarily part of the cell design, enabling multiple neighboring cells to contain islands of metal without placement dead zones that could be caused by cell boundary constraints, In one or more embodiments, the structure 100 also includes local interconnects 134 that are disposed between the gate metal pitches and the frontside signal wire and that are electrically connected between the signal via and the frontside signal wire.

In one or more embodiments, the structure 100 also includes a signal contact 136, as best seen in FIG. 2, that is electrically connected between the local interconnects and the signal via 124. Metal for the signal contact can be the same or different as the metal(s) used for the metal rails.

In one or more embodiments, the signal via 124 penetrates a negative-doped well 138 (an "N-well") in the structure.

In one or more embodiments, the frontside signal wire 122 extends perpendicular to the backside metal rails.

In one or more embodiments, the lengths of the backside metal rails are in the same plane.

In one or more embodiments, the structure 100 also includes a complementary metal-oxide-semiconductor inverter cell 140 that is adjacent to the signal transfer cell.

In one or more embodiments, the second backside metal rail is interrupted by cuts 142 at either side of the signal via. In one or more embodiments, each of the cuts is disposed beyond an edge of the signal transfer cell.

In one or more embodiments, the signal transfer cell is free of logic circuitry.

Figure 3:
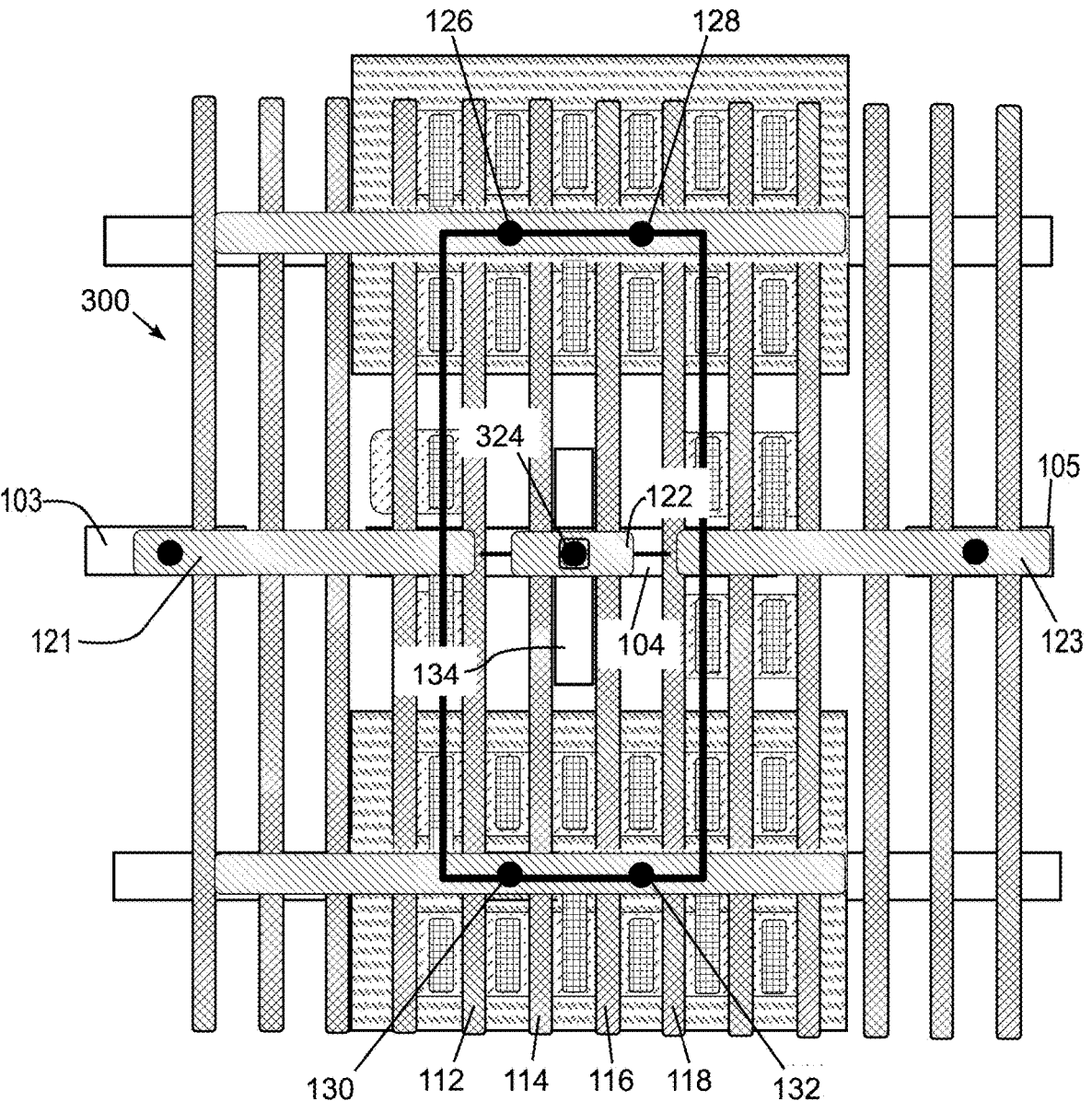
FIG. 3 depicts, in a schematic, a top down (plan) view of another semiconductor structure, according to exemplary embodiments.

FIG. 3 depicts, in a schematic, a top down (plan) view of another semiconductor structure 300, according to exemplary embodiments. The semiconductor structure 300 is broadly similar to the semiconductor structure 100. Similar components are similarly numbered and are as described with reference to FIG. 1, except that, rather than penetrating an n-well, the signal via 324 goes through bulk substrate.

Given the discussion thus far, it will be appreciated that, in general terms, a semiconductor structure 100, according to an aspect of the invention, includes a first backside metal rail 102 that extends across the structure in a first direction; a second backside metal rail 103, 105 that extends across the structure parallel and adjacent to the first backside metal rail. The first and second backside metal rails bound a first circuit row 106. The exemplary semiconductor structure also includes a backside metal rail 104 that interrupts the second backside metal rail; and a third backside metal rail 108 that extends across the structure parallel and adjacent to the second backside metal rail. The second and third backside metal rails bound a second circuit row 110. The exemplary semiconductor structure also includes adjacent and parallel gate metal pitches 112, 114, 116, 118 that extend across the structure perpendicular to and above the backside metal rails. The gate metal pitches define a width of a signal transfer cell that occupies the first and second circuit rows. The exemplary semiconductor structure also includes a frontside signal wire 122 that extends across the structure above the gate metal pitches; and a signal via 124 that penetrates the structure perpendicular to the metal rails and to the gate metal pitches and that connects the backside signal wire to the frontside signal wire.

In one or more embodiments, the signal via is disposed in a space between two adjacent ones of the gate metal pitches. In one or more embodiments, the exemplary semiconductor structure also includes peripheral vias 126, 128, 130, 132 that penetrate the structure perpendicular to the metal rails and to the gate metal pitches and in registry with the metal rails at edges of the signal transfer cell; locations of the peripheral vias and the signal via define an X.

In one or more embodiments, the exemplary semiconductor structure also includes local interconnects 134 that are disposed vertically between the gate metal pitches and the frontside signal wire and that are electrically connected between the signal via and the frontside signal wire.

In one or more embodiments, the exemplary semiconductor structure also includes a signal contact 136 that is electrically connected between the local interconnects and the signal via. In one or more embodiments, the signal contact extends perpendicular to the backside metal rails. In one or more embodiments, the signal contact is contained within the signal transfer cell.

In one or more embodiments, the exemplary semiconductor structure also includes a negative-doped well 138 in the structure, wherein the signal via penetrates the negative-doped well.

In one or more embodiments, lengths of the backside metal rails are in a same plane.

In one or more embodiments, the exemplary semiconductor structure also includes a complementary metal-oxide-semiconductor inverter cell 140 that is connected between the second and third backside metal rails, adjacent to the signal transfer cell.

In one or more embodiments, the second backside metal rail is interrupted by cuts 142 at either side of the signal via.

In one or more embodiments, each of the cuts is disposed beyond an edge of the signal transfer cell.

In one or more embodiments, the signal transfer cell is free of logic circuitry.

In one or more embodiments, the signal via is centered in the signal transfer cell.

In one or more embodiments, the frontside signal wire is broken into left, middle, and right segments, 121, 122, 123; the middle segment connects to the signal via in the signal transfer cell while the left and right segments extend outside the signal transfer cell. In one or more embodiments, portions of the left and right segments of the frontside signal wire extend within the signal transfer cell.

According to another aspect, as shown in FIG. 4, an exemplary method 400 for operating a semiconductor structure 100 includes, at 402, transmitting a bias signal through a frontside signal wire of the integrated circuit to a signal via of the integrated circuit; at 404, transmitting the bias signal through the signal via to a backside signal wire of the integrated circuit; and, at 406, transmitting the bias signal from the backside signal wire to a gate of the integrated circuit.

In one or more embodiments, the frontside signal wire, the signal via, and the backside signal wire are contained within a signal transfer cell.

According to another aspect, a circuit design structure is instantiated and then fabricated. For example, referring to FIGS. 5 and 7-9 discussed elsewhere herein, an exemplary method 500 for designing an integrated circuit includes, at 502, laying out a signal transfer cell that includes a frontside signal wire, a signal via, and a backside signal wire; and, at 504, laying out cells adjacent to the signal transfer cell so that at least the frontside signal wire does not extend beyond the signal transfer cell.

In one or more embodiments, the method for designing also includes, at 506, laying out the cells adjacent to the signal transfer cell so that the backside signal wire does extend beyond the signal transfer cell.

Figure 7:
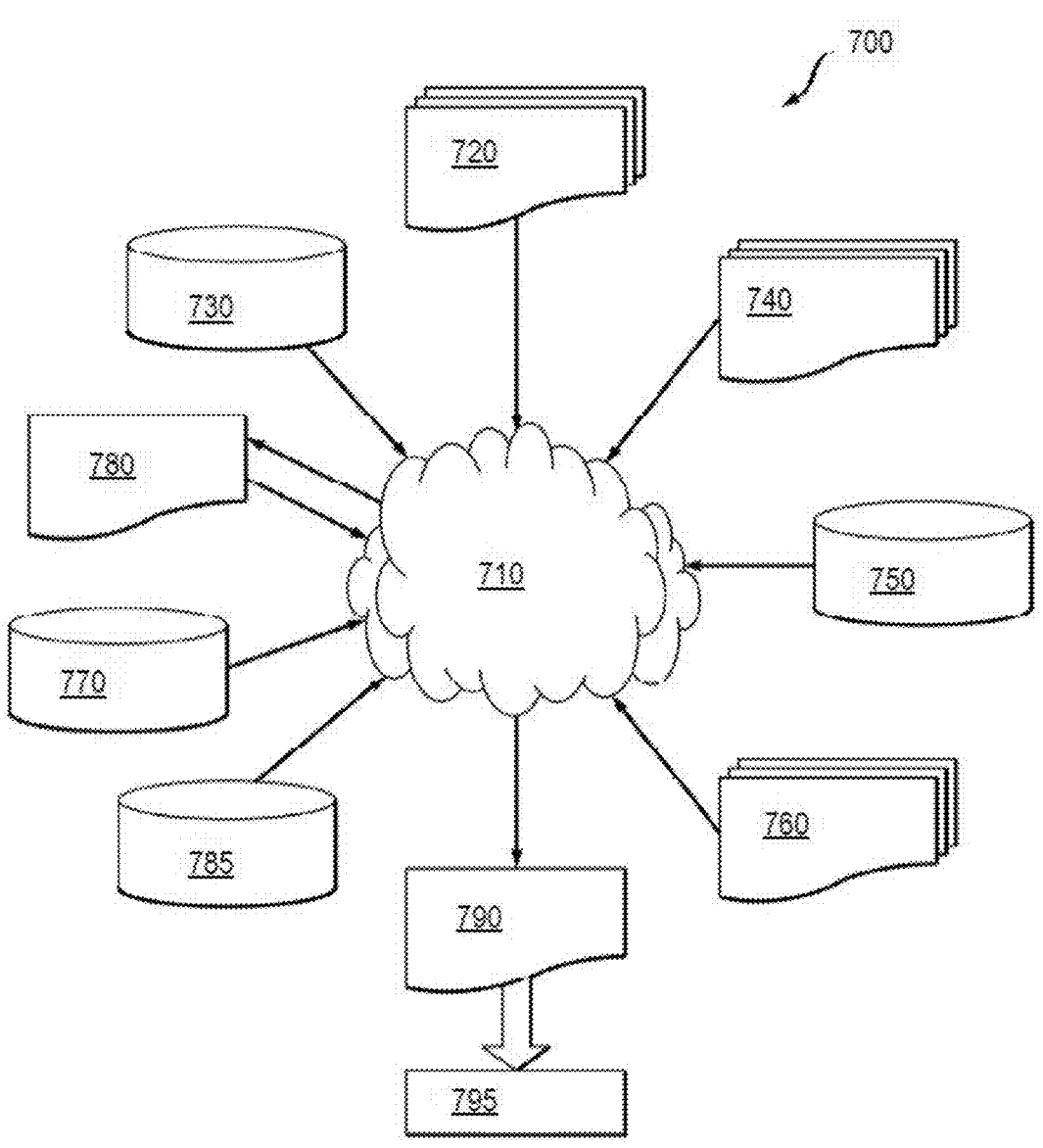
FIG. 7 is a flow diagram of a design process used in semiconductor design, manufacture, and/or test.

In one or more embodiments, a layout is instantiated as a design structure. In this regard, FIG. 7 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

Figure 8:
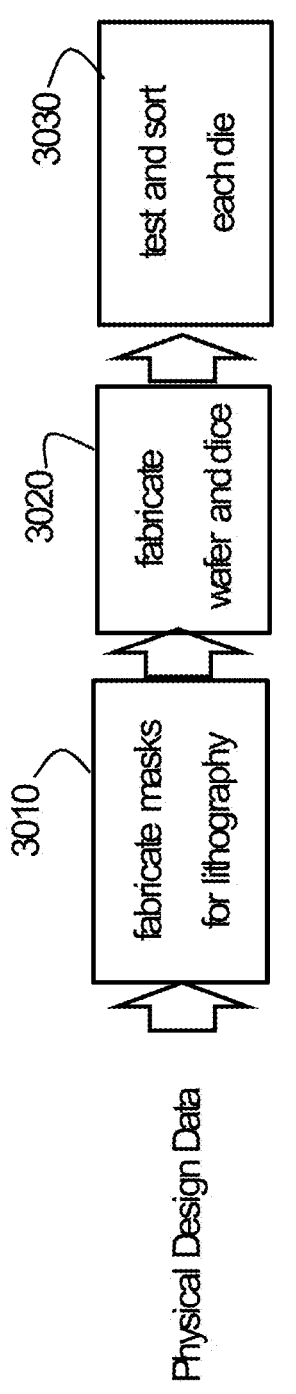
FIG. 8 shows further aspects of IC fabrication from physical design data.

Referring to the discussion of FIG. 7, a physical integrated circuit can be fabricated in accordance with the design structure. Refer also to FIG. 8. Once the physical design data is obtained, an integrated circuit designed in accordance therewith can be fabricated according to processes that are generally described with reference to FIG. 8. Generally, a wafer with multiple copies of the final design is fabricated and cut (i.e., diced) such that each die is one copy of the integrated circuit. At block 3010, the processes include fabricating masks for lithography based on the finalized physical layout. At block 3020, fabricating the wafer includes using the masks to perform photolithography and etching. Once the wafer is diced, testing and sorting each die is performed at 3030 to filter out any faulty die.

Furthermore, referring back to FIG. 7, in one or more embodiments, at least one processor (see discussion of FIG. 6 below) is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure.

Figure 9:
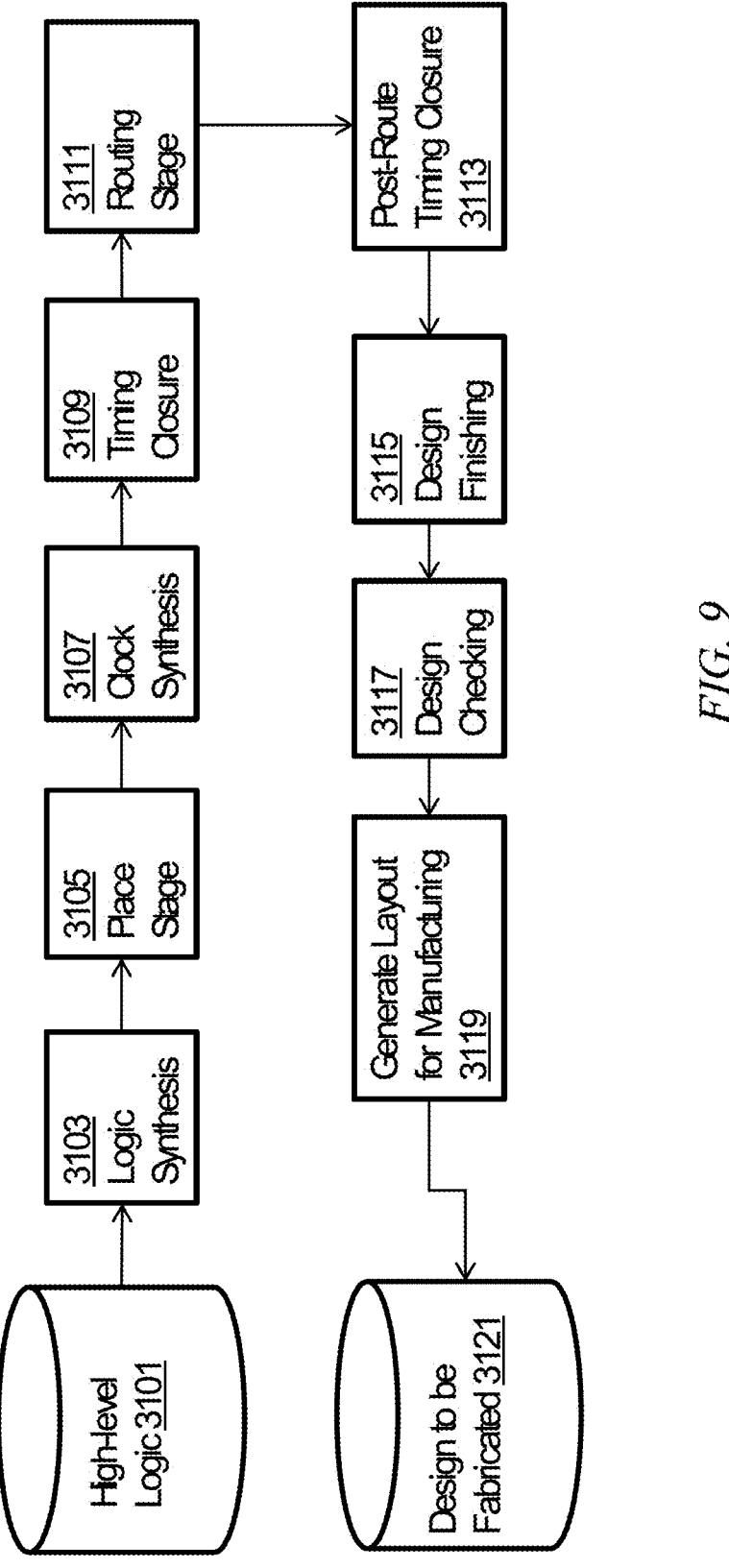
FIG. 9 shows an exemplary high-level Electronic Design Automation (EDA) tool flow.

FIG. 9 depicts an example high-level Electronic Design Automation (EDA) tool flow, which is responsible for creating an optimized microprocessor (or other IC) design to be manufactured. A designer could start with a high-level logic description 3101 of the circuit (e.g. VHDL or Verilog). The logic synthesis tool 3103 compiles the logic, and optimizes it without any sense of its physical representation, and with estimated timing information. The placement tool 3105 takes the logical description and places each component, looking to minimize congestion in each area of the design. The clock synthesis tool 3107 optimizes the clock tree network by cloning/balancing/buffering the latches or registers. The timing closure step 3109 performs a number of optimizations on the design, including buffering, wire tuning, and circuit repowering; its goal is to produce a design which is routable, without timing violations, and without excess power consumption. The routing stage 3111 takes the placed/optimized design, and determines how to create wires to connect all of the components, without causing manufacturing violations. Post-route timing closure 3113 performs another set of optimizations to resolve any violations that are remaining after the routing. Design finishing 3115 then adds extra metal shapes to the netlist, to conform with manufacturing requirements. The checking steps 3117 analyze whether the design is violating any requirements such as manufacturing, timing, power, electromigration (e.g., using techniques disclosed herein) or noise. When the design is clean, the final step 3119 is to generate a layout for the design, representing all the shapes to be fabricated in the design to be fabricated 3121.

Figure 6:
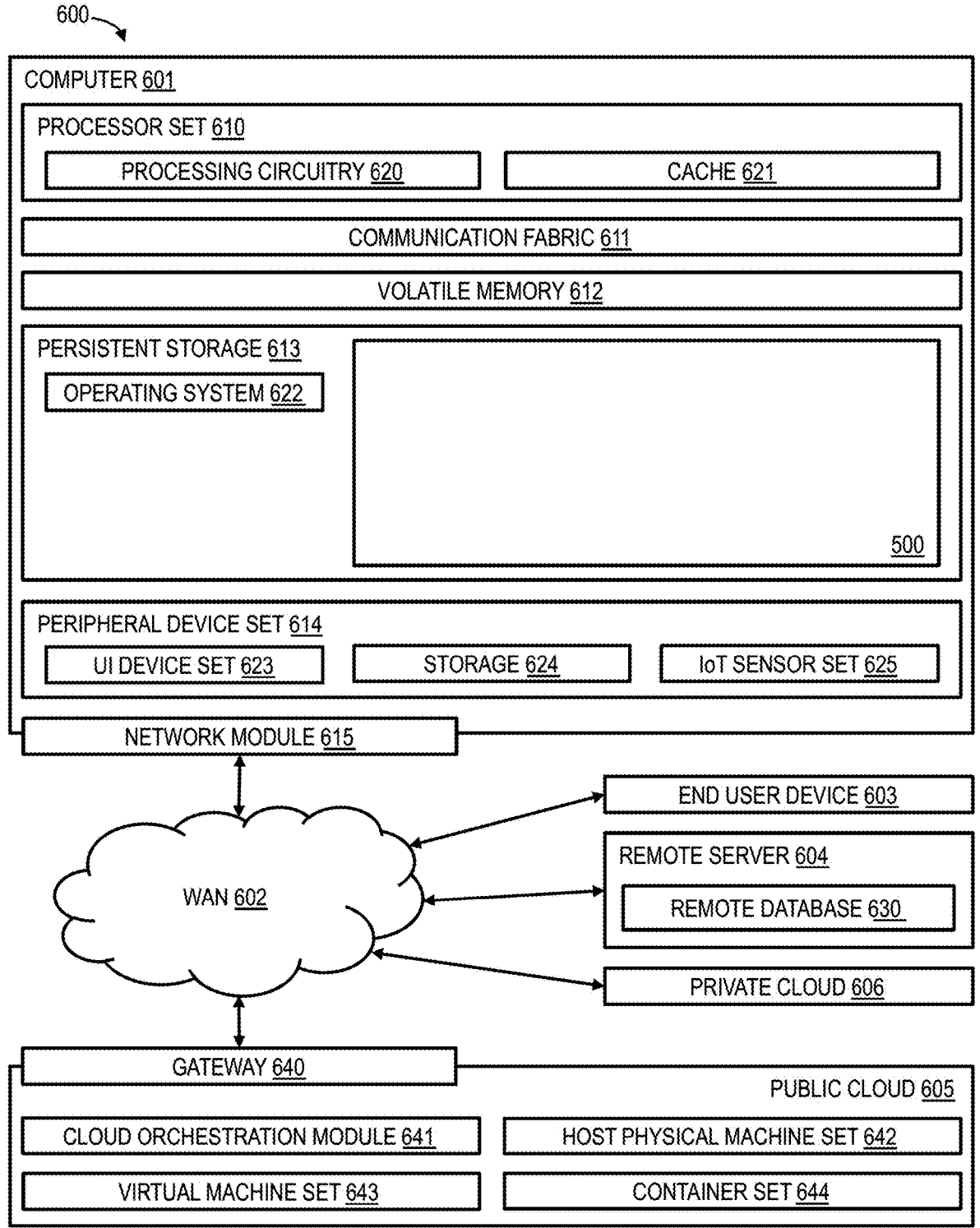
FIG. 6 depicts a computing environment usable in connection with semiconductor design, manufacture, and/or test.

Refer now to FIG. 6, FIG. 6 depicts a computing environment 600 usable in connection with semiconductor design, manufacture, and/or test.

Computing environment 600 contains an example of an environment for the execution of at least some of the computer code involved in performing the inventive methods, such as implementing the above-mentioned method for circuit design layout 500. In addition to block 500, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 500, as identified above), peripheral device set 614 (including user interface (UI) device set 623, storage 624, and Internet of Things (IOT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 500 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 500 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A semiconductor structure comprising:
   a first backside metal rail that extends across the structure in a first direction;
   a second backside metal rail that extends across the structure parallel and adjacent to the first backside metal rail, wherein the first and second backside metal rails bound a first circuit row;

a backside signal wire that interrupts the second backside metal rail;

a third backside metal rail that extends across the structure parallel and adjacent to the second backside metal rail, wherein the second and third backside metal rails bound a second circuit row;

adjacent and parallel gate metal pitches that extend across the structure perpendicular to and above the first, second, and third backside metal rails, wherein the gate metal pitches define a width of a signal transfer cell that occupies the first and second circuit rows;

a frontside signal wire that extends across the structure above the gate metal pitches; and a signal via that penetrates the structure perpendicular to the first, second, and third backside metal rails and to the gate metal pitches and that connects the backside signal wire to the frontside signal wire.

2. The semiconductor structure of claim 1, wherein the signal via is disposed in a space between two adjacent ones of the gate metal pitches.

3. The semiconductor structure of claim 1, further comprising:

peripheral vias that penetrate the structure perpendicular to the first, second, and third backside metal rails and to the gate metal pitches and in registry with the first, second, and third backside metal rails at edges of the signal transfer cell, wherein locations of the peripheral vias and the signal via define an X.

4. The semiconductor structure of claim 1, further comprising:

local interconnects that are disposed vertically between the gate metal pitches and the frontside signal wire and that are electrically connected between the signal via and the frontside signal wire.

5. The semiconductor structure of claim 4, further comprising:

a signal contact that is electrically connected between the local interconnects and the signal via.

6. The semiconductor structure of claim 5, wherein the signal contact extends perpendicular to the first, second, and third backside metal rails.

7. The semiconductor structure of claim 6, wherein the signal contact is contained within the signal transfer cell.

8. The semiconductor structure of claim 1, further comprising a negative-doped well in the structure, wherein the signal via penetrates the negative-doped well.

9. The semiconductor structure of claim 1, wherein lengths of the first, second, and third backside metal rails are in a same plane.

10. The semiconductor structure of claim 1, further comprising:

a complementary metal-oxide-semiconductor inverter cell that is connected between the second and third backside metal rails, adjacent to the signal transfer cell.

11. The semiconductor structure of claim 1, wherein the second backside metal rail is interrupted by cuts at either side of the signal via.

12. The semiconductor structure of claim 11, wherein each of the cuts is disposed beyond an edge of the signal transfer cell.

13. The semiconductor structure of claim 1, wherein the signal transfer cell is free of logic circuitry.

14. The semiconductor structure of claim 1, wherein the signal via is centered in the signal transfer cell.

15. The semiconductor structure of claim 1, wherein the frontside signal wire is broken into left, middle, and right segments, wherein the middle segment connects to the signal via in the signal transfer cell while the left and right segments extend outside the signal transfer cell.

16. The semiconductor structure of claim 15, wherein portions of the left and right segments of the frontside signal wire extend within the signal transfer cell.

17. A hardware description language (HDL) design structure encoded on a machine-readable data storage medium, the HDL design structure comprising elements that when processed in a computer-aided design system generates a machine-executable representation of an integrated circuit, wherein the HDL design structure comprises:

a first backside metal rail that extends across the structure in a first direction;

a second backside metal rail that extends across the structure parallel and adjacent to the first backside metal rail, wherein the first and second backside metal rails bound a first circuit row;

a backside signal wire that interrupts the second backside metal rail;

a third backside metal rail that extends across the structure parallel and adjacent to the second backside metal rail, wherein the second and third backside metal rails bound a second circuit row;

adjacent and parallel gate metal pitches that extend across the structure perpendicular to and above the first, second, and third backside metal rails, wherein the gate metal pitches define a width of a signal transfer cell that occupies the first and second circuit rows;

a frontside signal wire that extends across the structure above the gate metal pitches; and a signal via that penetrates the structure perpendicular to the first, second, and third backside metal rails and to the gate metal pitches and that connects the backside signal wire to the frontside signal wire.

18. The HDL design structure of claim 17, wherein the signal via is disposed in a space between two adjacent ones of the gate metal pitches.

19. The HDL design structure of claim 17, further comprising:

peripheral vias that penetrate the structure perpendicular to the first, second, and third backside metal rails and to the gate metal pitches and in registry with the first, second, and third backside metal rails at edges of the signal transfer cell, wherein locations of the peripheral vias and the signal via define an X.

20. The HDL design structure of claim 17, further comprising:

local interconnects that are disposed vertically between the gate metal pitches and the frontside signal wire and that are electrically connected between the signal via and the frontside signal wire.

21. The HDL design structure of claim 20, further comprising:

a signal contact that is electrically connected between the local interconnects and the signal via.

* * * * *